(12) United States Patent
Wyld et al.

(10) Patent No.: US 8,028,060 B1
(45) Date of Patent: Sep. 27, 2011

(54) BACKGROUND TASK EXECUTION OVER A NETWORK BASED ON NETWORK ACTIVITY IDLE TIME

(75) Inventors: Jeremy Wyld, San Jose, CA (US); Nitin Ganatra, San Jose, CA (US); Richard John Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 11/620,613

(22) Filed: Jan. 5, 2007

(51) Int. Cl.
*G06F 15/16* (2006.01)
*G06F 15/173* (2006.01)
*G06F 15/177* (2006.01)

(52) U.S. Cl. .............. 709/224; 709/203; 726/1
(58) Field of Classification Search .......... 709/217–228, 709/203; 726/1
See application file for complete search history.

(56) References Cited

U.S. PATENT DOCUMENTS

| 6,366,947 | B1 * | 4/2002 | Kavner .................... 709/203 |
| 6,708,332 | B2 * | 3/2004 | Murphy et al. ............ 717/168 |
| 7,383,457 | B1 * | 6/2008 | Knight ...................... 713/323 |
| 7,725,128 | B2 * | 5/2010 | Marsh et al. .............. 455/556.1 |
| 2003/0162549 | A1 * | 8/2003 | Carlsson .................... 455/456 |
| 2006/0070023 | A1 * | 3/2006 | D'Souza et al. ........... 717/104 |
| 2006/0184613 | A1 * | 8/2006 | Stienessen et al. ......... 709/203 |
| 2008/0059592 | A1 * | 3/2008 | Marsh et al. ............... 709/206 |
| 2008/0108346 | A1 * | 5/2008 | Umatt et al. .............. 455/432.1 |
| 2008/0127292 | A1 * | 5/2008 | Cooper et al. ................. 726/1 |
| 2008/0133739 | A1 * | 6/2008 | Zuzga et al. ................ 709/224 |
| 2008/0228772 | A1 * | 9/2008 | Plamondon ................. 707/10 |

* cited by examiner

*Primary Examiner* — Haresh N Patel
(74) *Attorney, Agent, or Firm* — Blakely, Sokoloff, Taylor & Zafman LLP

(57) ABSTRACT

Network activity of a client device that is coupled to a data network is monitored, to detect network activity idle time. Based upon detecting the idle time, an application running in the client device is automatically signaled that its background task be executed over the data network. Other embodiments are also described and claimed.

18 Claims, 4 Drawing Sheets

BACKGROUND TASK EXECUTION OVER A NETWORK BASED ON NETWORK ACTIVITY IDLE TIME

An embodiment of the invention is directed to managing data network communications in a client device. Other embodiments are also described.

BACKGROUND

A data network allows people to communicate with each other and obtain information from various sources on the network, using their respective client devices that are "on" the network. For example, a Web browser application program, running in a user's workstation or laptop computer, can connect with a Web server to download a Web page. The connection may span several intermediate nodes or hops of the network, which may include specialized computers such as routers. These devices can discover routes between the end nodes through which they can forward messages that have been broken up into packets of data. Each node may be assigned a unique or global address, such as an Internet Protocol (IP) address. The Internet is a well known global internetwork in which networks of computers are connected to each other via routers.

Computer network protocols have a layered architecture. Typically, the upper most layer includes the functionality provided by an application program, such as a Web browser. This is the layer that, at least in the end nodes, may initiate a connection between two computers over a network. Thus, for example, a user may select a desired Website on his computer. The Web browser (running in that computer) starts a procedure that results in a connection being made with a server that is associated with the selected Website. The Web browser sends the request "down" through a series of functions referred to as an Internet protocol suite or Transport Control Protocol/Internet protocol (TCP/IP) stack. This stack of protocols is typically implemented in software at its higher layers, often as part of an operating system (OS) program running in the client device. Once the selected Website has been translated into an IP address of a Web server, the server is contacted over the Internet, and an appropriate connection is made with an upper layer program of a similar protocol suite implemented in the Web server.

To use the connection, the TCP/IP stack in the user's computer encapsulates a request message from the Web browser, in this example, a request identifying the Web page. The message may be encapsulated more than once, by several vertical layers on its way down in the protocol stack, including a network access layer. It finally arrives at the lowest layer of the client device, namely the physical layer (which is typically deemed to be a part of the network access layer).

After leaving the physical layer of the user's computer and then making its way through one or more hops in the network, the message from the Web browser arrives in the Web server, and is passed "up" the protocol stack in the Web server to a program that is deemed a peer of the Web browser. The peer program may then respond to the message, by causing the data for the requested Web page to be collected and sent back to the user's computer through the existing network connection. The data is broken up into multiple messages or packets, and is sent in a manner analogous to how the request message was sent.

An application program can have several tasks or processes, that are executed by one or more processors in the user's computer. When the computer is viewed as a time-sharing system, a task executing in foreground is given a higher priority, to use the resources in the computer, than a background task. Typically, the user interacts with only one foreground task per terminal, or terminal window, to minimize confusion. When a user selects a particular window, for example one belonging to an email application, all other tasks that are being executed may become background tasks.

Both foreground and background tasks can access the data network. To access the network, an application program may first request an operating system (OS) in the user's computer to open a connection with the remote server. Once the connection has been opened, the remote server is said to be listening for requests from the OS in the user's computer. The foreground task in the user's computer can now communicate with the remote server. When finished with the foreground task, the application may perform any background tasks it has over the open connection (before signaling the OS to close the connection). As an example, a user finishes reading her new email messages (using an email client application), and then clicks on a Web browser window, to start surfing the Web. The email client, now in background, can periodically check with the remote email server for any new messages, using its open connection.

Each application program typically gets its own port or connection to the network, though they may all share the same lower layer network resources in the user's computer. Thus, referring back to the example given above, while the email program may be mostly dormant from a network activity standpoint once the user has clicked on the Web browser window, network activity resumes when the user clicks on a link to a Web page.

SUMMARY

An embodiment of the invention is a computer-implemented method for background task execution over a data network. Network activity of the client device is monitored, preferably from within the client device, to detect network activity idle time. Based upon detecting the idle time, an application running in the client device is automatically signaled that its background task be executed over the data network.

In one embodiment, the application has registered with a callback mechanism of a software component in the client device. On the basis of the registration, the application is then notified by the software component that it is time to execute its background task over the data network. Other embodiments are also described.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
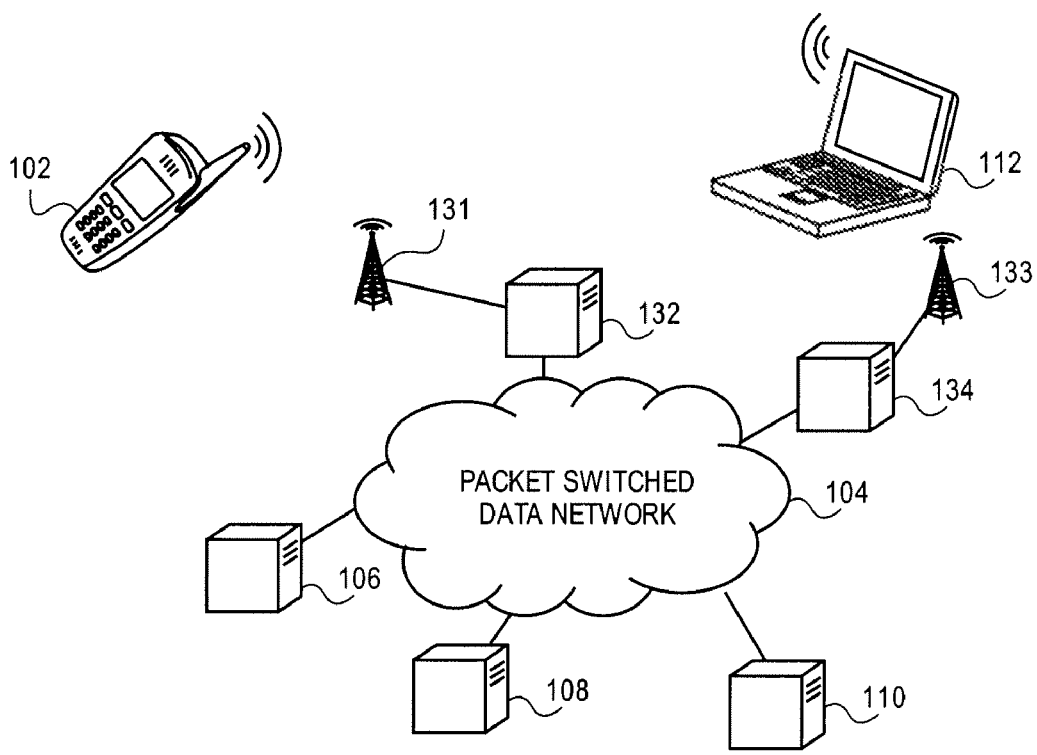
FIG. 1 is a block diagram of a data network environment in which an embodiment of the invention lies.

An embodiment of the invention is directed to a computer-implemented method for background task execution over a data network. FIG. 1 is a block diagram of a data network environment in which an embodiment of the invention lies. A client device 102 is on a packet switched data network 104. The network 104 may be an Internet Protocol (IP) network, which may be a wide area network or a global, public inter-network of nodes that are interconnected by routers, such as the Internet. Also on the network are an email server 106, a voicemail server 108, a Web server 110, and another client device 112 (in this case, a laptop computer). These are just examples of the different end nodes with which the client device 102 can communicate.

The client device 102 may be a desktop computer, a notebook or laptop computer, a video game machine, or other consumer electronic device. In this example, the client device 102 is a portable wireless device that may include two-way voice, email messaging, and media playback functions. The communication path between the client device 102 and a server, in this example, has a wireless segment between the client device 102 and a wireless base station 131. An application program in the client device 102 uses a protocol suite or stack (such as a TCP/IP suite) in the client device, to communicate with a peer program in a remote server. In the Internet reference model, the client device 102 communicates with a network access gateway 132 via the base station 131, in accordance with any suitable wireless communications network access protocol, examples of which are given below. The other client device 112 may be reached via the combination of another base station 133 and gateway 134. On top of the network access layer are the internetworking layer (e.g., defining an Internet Protocol, IP, address for each node on the network), the transport layer (e.g., Transport Control Protocol, TCP, performing host-to-host flow control and the opening and closing of connections), and the application layer (e.g., application programs and process protocols such as HTTP, SMTP, and SSH).

Figure 2:
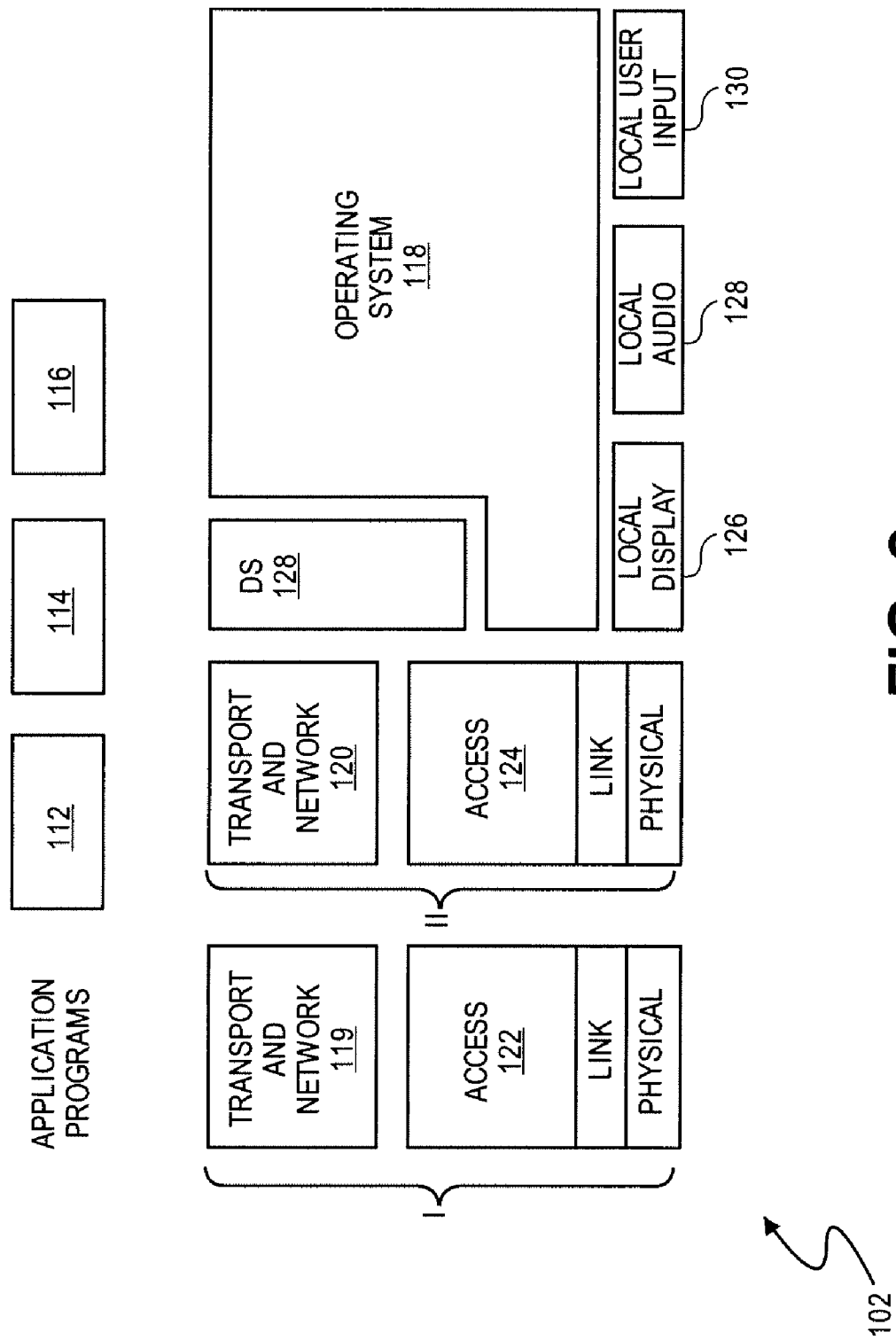
FIG. 2 is a block diagram of an example client device with networking capability.

Turning now to FIG. 2, a block diagram of an example client device with networking capability is shown, in accordance with an embodiment of the invention. One or more application programs 112-116 are stored in the client device 102. An application program may be, for example, a Web browser, a dedicated email client, a voice over IP telephony client, or a widget that accesses the Internet regularly, for example to show the latest news or check the current weather. The application programs 112-116, as well as the other software components described below, are comprised of instructions stored in some form of machine-readable medium within the client device 102. The machine-readable medium may be part of a solid-state memory, a rotating magnetic disk drive, or other suitable storage device. The client device also includes one or more processors (not shown) that are to execute the stored instructions to perform the functionality described below.

The application programs 112-116 run on top of an operating system (OS) 118. An example of the OS 118 is the Mac OS by Apple Computer, Inc. of Cupertino, Calif., for a desktop or laptop client device. Alternatively, an embedded or real-time operating system may be used, in situations where the client device 102 is an embedded computer system such as a personal digital assistant (PDA) handset or a cellular telephone handset. The client device 102 may also include a local display interface 126 that allows the OS 118 (and the application programs 112-116) to display text and graphics to the user, a local audio interface 128 which may include, for example, speakers, and a local user input interface 130 which may include a keyboard, an alphanumeric keypad, a mouse or other cursor control and pointing device, and a combination touch sensitive display surface.

To communicate with another node in the network 104, the client device 102 may implement at least one set of transport and network layers 119 of a network communications protocol. These may be part of a TCP/IP stack, also referred to as an Internet protocol suite. There may also be a second set of transport and network layers 120 available that implement a different network communications protocol suite. Each set of network and transport layers 119, 120 is on top of a network access layer 122, 124. The network access layer may be viewed as split into a data link layer on top of a physical layer. Examples of network access layer protocols are Ethernet, Wi-Fi, Bluetooth, General Packet Radio Services (GPRS), and UMTS.

In accordance with an embodiment of the invention, the client device 102 also stores a software component referred to here as a daemon server, DS, 128 which manages data network communications for background tasks as described below in connection with FIG. 5.

Figure 3:
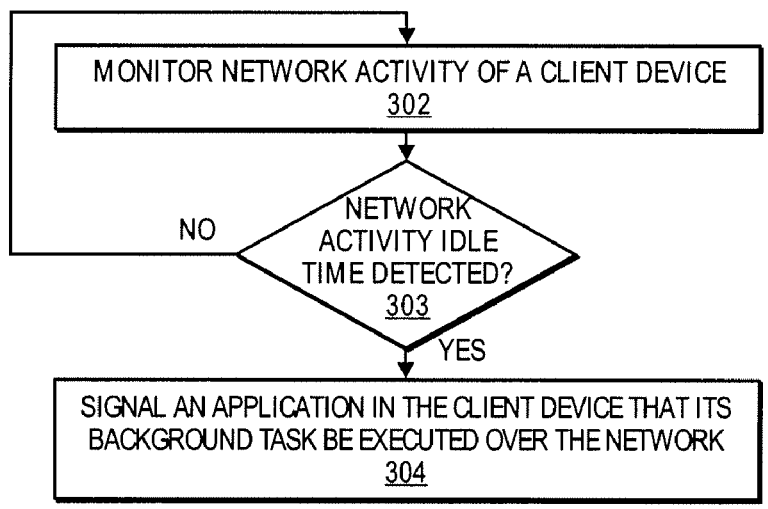
FIG. 3 is a flow diagram of a computer-implemented method for background task execution over a data network.

FIG. 3 is a flow diagram of a computer-implemented method for background task execution over a data network, in accordance with an embodiment of the invention. Network activity of the client device 102 is monitored, preferably from within the client device 102, to detect network activity idle time (block 302). The client device may be a portable, handheld computer system such as a personal digital assistant or a multi-function handset that features data networking functions such as remote email access for its user, Web browsing, and Internet telephony. Network activity may include communications between the client device and a server node on a packet switched data network, such as an IP network. The network activity may be monitored by, for example, running a software component, referred to as a daemon server below, in the client device 102. The software component may count the number of upstream and/or downstream bytes and data packets passing through a given connection, such as a TCP connection. As another example, the number of bytes being transferred through a network access layer (below the TCP layer) in the client device 102 may be monitored. The latter could encompass the network activity of all open connections that are using the particular network access layer.

Network activity idle time may be detected by measuring Internet data traffic over a recently occurring, time interval or duration, and then immediately comparing the measured traffic to a threshold traffic rate. In certain embodiments, the time interval may be predefined, while in others it may be dynamically generated over time. In one embodiment, if the measured traffic is less than a given number of bytes per second on average over the given time interval, then network activity idle time has been reached.

In one embodiment, the following process may be used to determine network activity idle time. First, the client device makes a record of its current, network throughput. It then starts a timer. If network activity (e.g., a threshold number of bytes or packets in the upstream or downstream direction, within a given time interval) occurs before the timer expires, then the timer is reset. Otherwise, if the timer expires and the threshold number has not been exceeded, network activity idle time has been detected. At that point, one or more applications running in the client device 102 can be signaled that now is an opportune time for them to perform their background tasks over the network.

When the network activity has sufficiently slowed down (and the idle time has thus been reached, block 303), an application program running in the client device 102 is signaled to execute its background task over the network (block 304). The application can have both background and foreground tasks that access the network. For example, an email program has a foreground task that allows the user to create and then send new messages. While in background, the email program may need to periodically check a remote email server for new messages addressed to the user. In accordance with an embodiment of the invention, performing this checking for new email messages (or, more generally, executing a background task over the network) in response to receiving the signal of network activity idle time, helps make more efficient use of the network capability, thereby improving the user's experience with networking functions on the client device.

Figure 4:
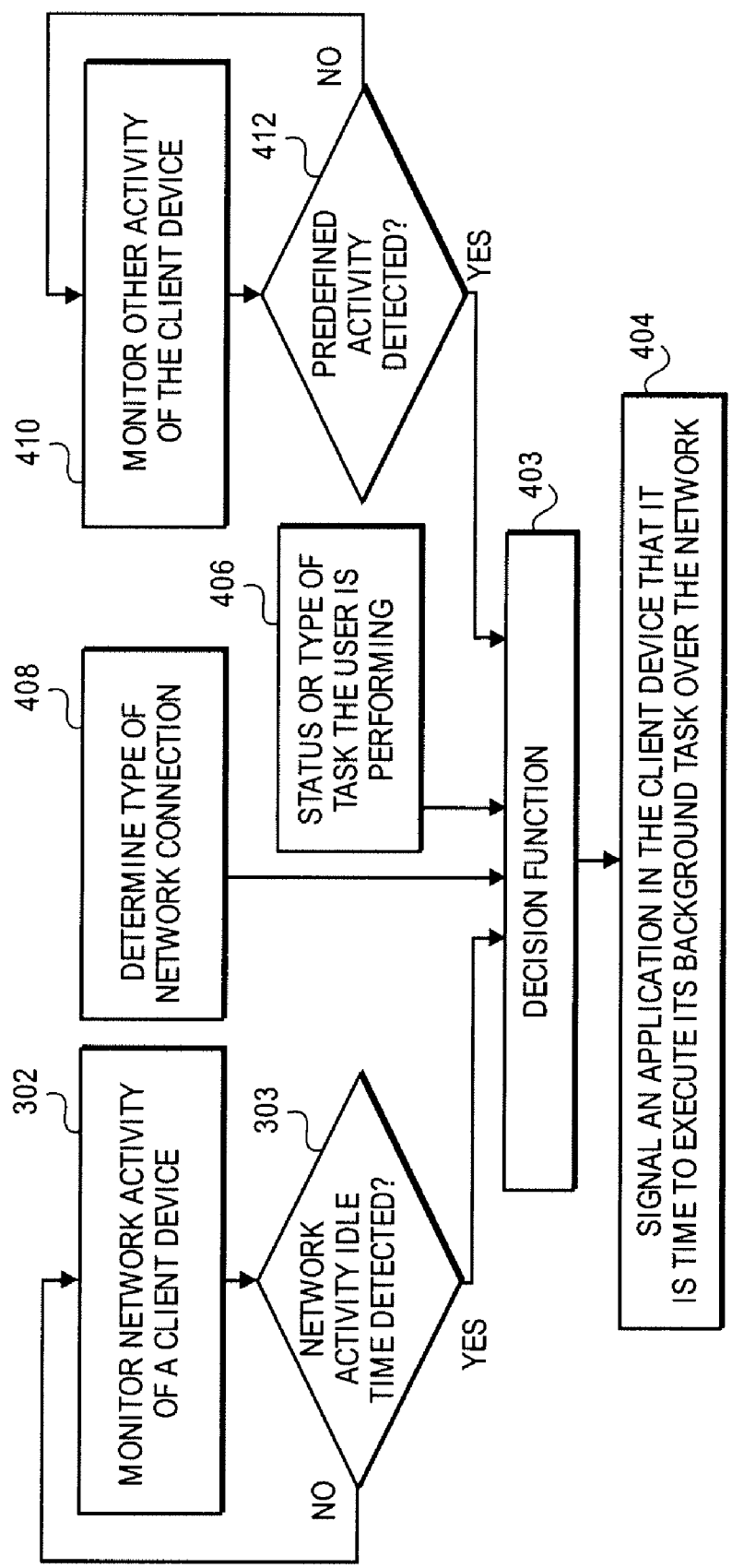
FIG. 4 is a flow diagram of another computer-implemented method for background task execution.

Turning now to FIG. 4, a flow diagram of another computer implemented method for background task execution is shown. In this method, in addition to monitoring network activity to detect network activity idle time (blocks 302, 303), the method performs a decision function 403 that takes input from additional criteria. Examples of such additional criteria are determining the type of network connection (block 408), determining the status or type of task or application that the user is performing, or is about to perform (block 406), and monitoring other activity of the client device (block 410).

Determining the type of network connection may involve, for example, making a call to the BSD Unix function, ioctl. Other known techniques for gathering information on the type of network connection or network interface being used in the client device are possible.

An example of block 406 would be whether the task or application is of the kind that is likely to generate Internet use. For example, the user may have spent the last few minutes interacting with a digital photography application that typically does not involve much Internet access. Continued monitoring of the user's activity on such an application may reveal that predefined, "non-network" activity has been detected (block 412). This determination, together with having detected network activity idle time (block 303), could result in the decision function 403 indicating that this is an opportune time to execute background tasks over the network (block 404). For example, accessing local images stored in the client device may not require network access, indicating an opportune time to perform background tasks over the network.

As another example of blocks 410, 412, a telephone keypad in the client device may be monitored, to detect whether the user is pushing buttons to dial a telephone number. That finding could be used by the decision function 403 to suggest that it is not an opportune time for background task execution over the network, if doing so would consume bandwidth needed for the telephone call. The duration of time spent on a particular task may also be used to influence the decision function 403 (e.g., once the user has spent a predetermined period of time with a word processor application in foreground, this may suggest an opportune time for a background task to access the network). As another example, determining that a Web browser running in the client device has changed its status from foreground to background, may be used to lean in favor of signaling that it is time to execute a background task.

Figure 5:
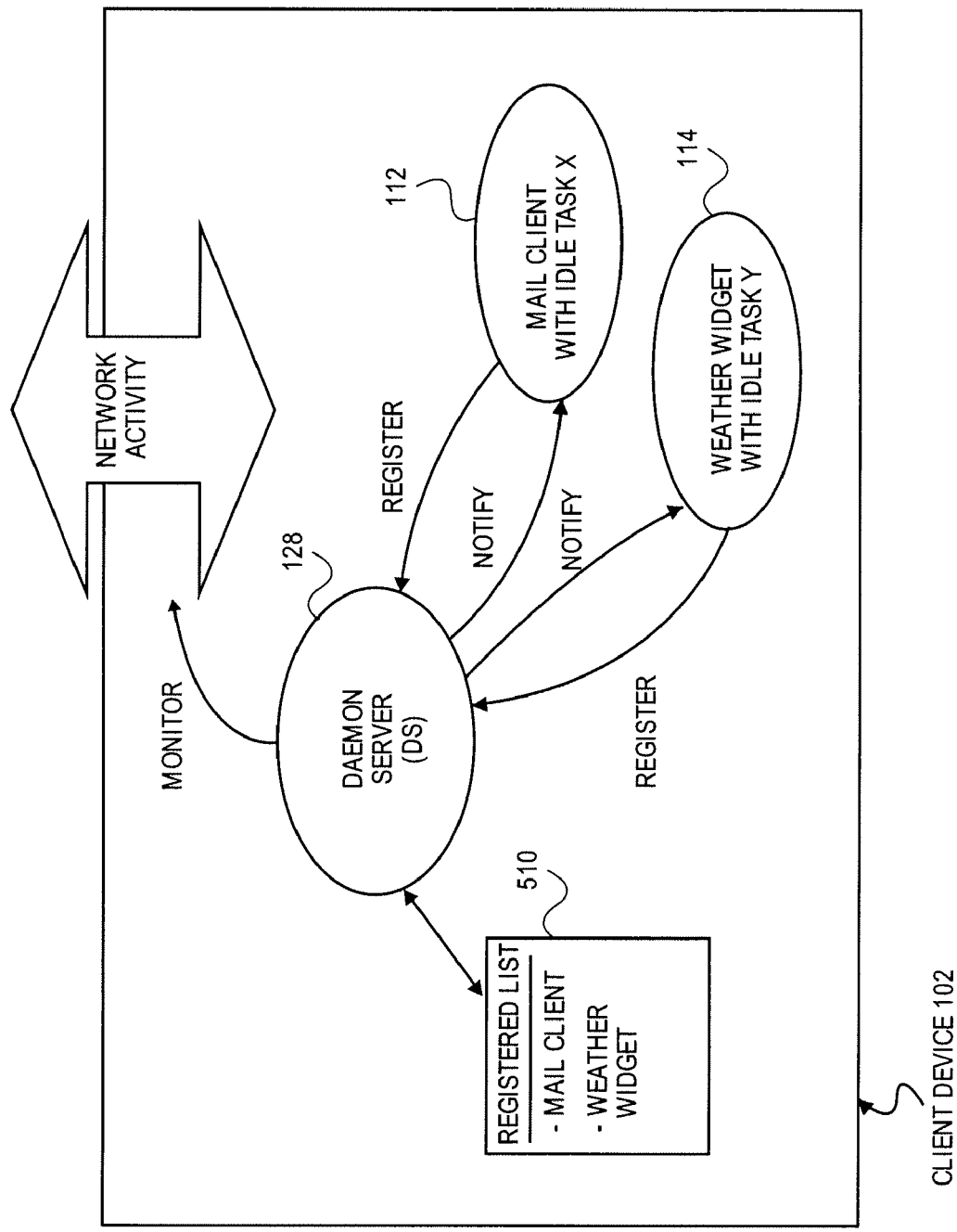
FIG. 5 is a block diagram of a daemon server interacting with registered applications.

Turning now to FIG. 5, a block diagram of a daemon server, DS, 128, interacting with applications in the client device 102 is shown. An application program running in the client device may be hooked up with an OS running in the client device. For example, the application may choose to register with a call-back mechanism of a software component in the client device, in this example that of the DS 128. In this example, application 112 is a mail client, while application 114 is a widget (e.g., a weather checker client which can be present on the dashboard of an OS). The DS 128 maintains a registered list 510 of such applications. On the basis of its respective registration, each application 112, 114 is notified by the DS 128, when the DS 128 has determined that it is an opportune time to execute a background task over the data network. As there may be several applications that have registered with the DS 128 (to execute their background tasks), the DS 128 may maintain a queue of registered applications or tasks (a "background task queue"). The DS 128 may thus notify the registered applications in, for example, round-robin, or other order. Note that the DS 128 may be integrated with or part of an operating system program in the client device, that is, they may have been developed and/or marketed by the same entity.

From the standpoint of the DS 128, a request may be received from an application program 112 or 114 in the client device, to register with a call-back mechanism. The DS 128, on the basis of the registration, then notifies the registered application when network activity idle time has been detected. The registered application may then interpret this notification to mean that now is an opportune time to execute its background task over the network. In one embodiment, the application may, in response to the notification, perform its background task without further assistance from the DS 128. In another embodiment, the application 112, 114 may pass its background task to the DS 128 for execution.

The interaction between the DS 128 and the individual applications may be further involved, as follows. An application program may, in response to being notified by the DS 128, inform the DS 128 that it has no background task to execute at this time. This information may be used by the DS 128 to further inform the decision to signal another application that it is an opportune time to execute a background task. For example, in certain embodiments, if most of the clients in the register list 510 inform the DS 128 that they have a background task to be executed immediately, then the DS 128 may use that information to decide that network activity is on the rise, such that a measurement of network activity (and further notifications to its clients) should be delayed for the time being.

In a further embodiment, an application program may specify a particular network transport physical layer (NTPL) when registering with the call-back mechanism. This allows a client to specify which of a number of different NTPLs in the client device are to be used for executing its background tasks. For instance, a user might want her cellular telephone voicemail client to be checked only using a GPRS connection. The DS 128 would then notify that client only when the GPRS network access layer exhibits idle time.

In yet another embodiment, a client of the DS 128 may specify, e.g., when registering with the call-back mechanism, a set time in the future when it is to be notified by the DS 128. This may involve setting a future date, or a fixed recurring time (e.g., everyday). Alternatively, the client may specify that it be notified upon expiration of a duration, e.g. in 10 minutes. However, given that it is not clear when a network interface will become idle, clients of the DS 128 should accept this lack of clarity. Thus, instead of being notified at the 10 minute mark, the client may need to tolerate being notified a little earlier or a little later. This should not be a problem given that most of the background tasks are, generally speaking, low priority items, relative to foreground tasks. As another alternative, the DS 128 may be instructed to check for network idle time (and notify members in its list) each time a network location change occurs in the client device.

In some cases, the application can be allowed to force its background task to be executed over the data network, regardless of whether it has been notified by the DS 128. This may be, for example, in response to not having been notified by the DS 128 upon expiration of a timer.

In accordance with another embodiment of the invention, the DS 128 notifies the applications (which may be registered with it) that network activity idle time has been detected, in response to an indication that the client device will soon be entering a lower power consumption mode (e.g., a sleep mode). For example, the OS may signal the DS 128 that the client device will be put to sleep in five minutes. The DS 128 may in response reevaluate the decision in block 303 of FIG. 3, namely whether it has detected network activity idle time, prior to signaling one or more applications (that are listed in its background task queue) that their background tasks should now be executed over the network.

In another embodiment, the operating system may instruct the DS 128 that the user is currently interacting with the client device (e.g., the user may be entering data through a keypad or moving a cursor on a display). The DS 128 may then respond by delaying the sending of any notifications to the clients listed in its background task queue.

Application Programming Interface

An application programming interface (API) may be provided by the author of the DS 128 software component, that allows the interaction between the DS 128 and the application programs depicted in FIG. 5. In addition, the DS 128 needs to recognize or otherwise obtain knowledge of network activity, as mentioned above. One way to do so is to provide an API in an interface to a call stack within an operating system, which allows any client (and in particular, the DS 128 acting as a client) to ask for current usage statistics on a given network connection. For instance, a function named getStatistics may be defined that returns the number of upstream bytes and packets, and the number of downstream bytes and packets, that have been transferred through a given data connection over a certain time interval. In implementations that use a BSD Unix operating system in the client device 102, a call to the BSD library function, getifaddrs, or get interface addresses, can be used by the DS 128 to evaluate the numbers regarding bytes and packets being transferred through a particular network interface of the client device.

The DS 128 may also need to determine which process or task is in the foreground. This can be done using a mechanism such as that provided by the OS X operating system of Apple Computer, Inc. With OS X, the foreground process can be determined by using the GetFrontProcess function, to obtain the process serial number of the front process. The function provides at its output the process serial number of the process which is running in the foreground. This function may be used to determine if a particular process, or some other process, is in the foreground.

The forgoing description has used specific embodiments of the invention. It will be apparent, however, that variations and modifications may be made to the above, in order to obtain some or all of the advantages mentioned. It is intended that the appended claims cover all such variations and modifications as they would fall within the true spirit and scope of the invention.

What is claimed is:

1. A computer-implemented method for background task execution in a portable wireless client device coupled to a data network, comprising:

hooking up with a first application running in the portable wireless client device;

monitoring network activity of the portable wireless client device to detect network activity idle time for the data network;

determining, by a hardware processor, a status or type of a second application that is running in the portable wireless client device, including monitoring how much time the second application is spending in foreground performing a non-network task; and based upon detecting the idle time of the data network and the determined status or type of the second application, automatically signaling the first application running in the portable wireless client device to have a background task of the first application executed over the data network.

2. The method of claim 1, wherein the data network is an Internet Protocol (IP) network.

3. The method of claim 1, wherein the monitoring network activity of the portable wireless client device comprises:

counting the number of upstream or downstream data units, passing through a connection to the data network or through a network access layer during a predetermined time interval.

4. The method of claim 1, wherein the determined type refers to the second application as one that is not likely to generate Internet use.

5. The method of claim 1, wherein the determined status refers to the second application as being in background.

6. The method of claim 1, wherein the determining a status or type of the second application further includes: monitoring activity on the second application to determine the status of the second application as performing predefined, non-network activity.

7. An article of manufacture comprising:

a non-transitory computer storage medium that stores instructions for an operating system program which configure a portable wireless client device that is coupled to a data network so that the client device:

a) monitors network activity for the data network in the client device, b) hooks up with a first software application in the client device, c) determines status or type of a second software application in the client device, including monitoring how much time the second application is spending in foreground performing a non-network task; and d) executes a background task of the first software application in response to (i) having detected network activity idle time of the data network and (ii) the determined status or type of the second software application.

8. The article of manufacture of claim 7, wherein the medium stores further instructions which cause the client device to maintain a list of software applications that have registered with a callback mechanism, the callback mechanism to notify the listed applications in round robin that their background tasks can now be executed over the data network.

9. The article of manufacture of claim 7, wherein the medium stores further instructions which cause the client device to determine the type of the second software application as one that is not likely to generate Internet use.

10. The article of manufacture of claim 7, wherein the medium stores further instructions which cause the client device to determine the status or type of the second software application by monitoring user activity on the second software application to determine the status of the second software application as performing predefined, non-network activity.

11. The article of manufacture of claim 7, wherein the medium stores further instructions which cause the client device to determine the type of said second software application as one that is not likely to generate Internet use.

12. An apparatus comprising:
a portable wireless device, that accesses a network, the portable wireless device having first and second applications and an operating system, the first application is registered with the operating system for execution of a background task of said first application that accesses the network, the operating system to notify the first application in response to having detected network activity idle time for the network and determined a status or type of the second application, to enable execution of a background task of said first application that accesses the network, the status or type of the second application is determined in part by monitoring how much time the second application is spending in foreground performing a non-network task.

13. The apparatus of claim 12, wherein the operating system is to notify a plurality of applications, which have previously registered with it, in a round robin manner to execute their background tasks over the network.

14. The apparatus of claim 12, wherein the network to be accessed is the Internet.

15. The apparatus of claim 14, wherein the operating system is to detect network activity idle time by a) measuring Internet data traffic over a predefined time interval and b) comparing the measured traffic to a threshold traffic rate.

16. The apparatus of claim 12, wherein the operating system is to determine the type of the second application as one that is not likely to generate Internet use.

17. The apparatus of claim 12, wherein the determined status refers to the second application as being in background.

18. The apparatus of claim 12, wherein the operating system is to determine the status or type of the second application by monitoring user activity on the second application to determine the status of the second application as performing predefined, non-network activity.

* * * * *